March 27, 1934.  H. C. BOSTWICK  1,952,905

TIRE MACHINE BEAD SETTER

Filed Nov. 11, 1932

Inventor
H. C. Bostwick,
By Robert W. Pierson,
Attorney

Patented Mar. 27, 1934

1,952,905

UNITED STATES PATENT OFFICE 1,952,905

TIRE MACHINE BEAD SETTER

Henry C. Bostwick, Akron, Ohio, assignor to The Akron Standard Mold Company, Akron, Ohio, a corporation of Ohio Application November 11, 1932, Serial No. 642,153

17 Claims. (Cl. 154—9)

This invention relates to bead setters for tire-building machines, and it has for its object to provide improved mounting and operating means for the centering and supporting rings employed in positioning the bead cores quickly and accurately against the carcass material on the tire-building form. Such form may, for example, be a drum with depressed bead seats employed in flat-band tire building or it may be a tire-shaped core.

One of the improved results obtained by my invention in its preferred form consists in allowing more convenient access of the operator to the rear or inner bead, and permitting the use of drums of maximum width or axial length, through a novel motion imparted to the corresponding beat-setting ring; and further results consist in a simplification and greater speed of operation, through a novel motion imparted in a single plane to one or both of the bead-setting rings, including a retracting movement to positions below the form axis, and through the provision of a single operating ram or equivalent for both bead-setting rings.

Figure 1:
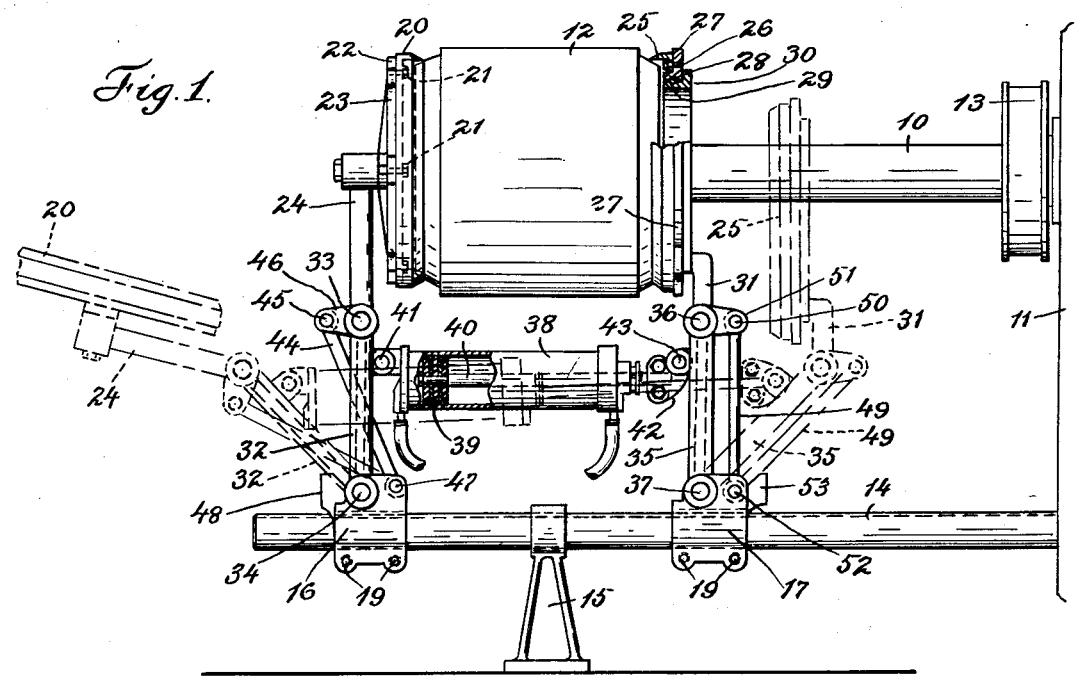

Of the accompanying drawing, Fig. 1 is a side elevation, partly in section, showing a preferred embodiment of my invention.

Figure 2:
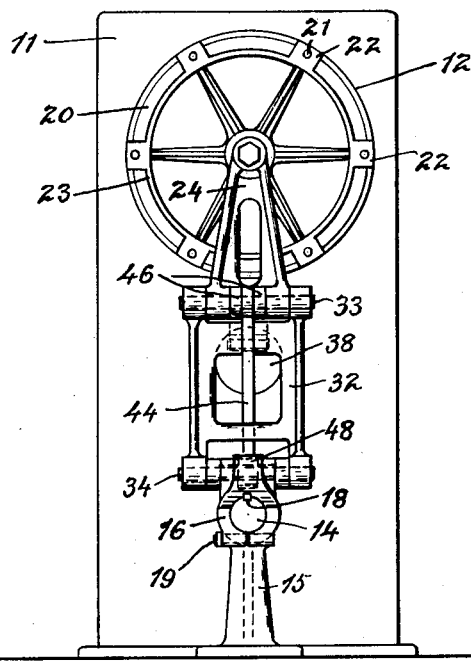

Fig. 2 is a forward end elevation.

In the drawing, 10 is a part of the shaft structure projecting horizontally from the main casing 11 of a tire-building machine and enclosing a part of the length of an internal shaft which carries the rotary tire-building form or drum 12 at its forward end. The latter may be of any suitable collapsible segmental type and the element 10 may be a controlling sleeve having a brake drum 13 retardable at will by means of a brake to collapse the form 12 during rotation thereof for removal of the finished tire band.

14 is a fixed rod parallel with the axis of rotation of the drum and located below the latter in the vertical plane thereof, said rod being supported at one end by the machine casing 11 and at a forward point by a pedestal 15. Said rod supports the front and rear bead setters through a pair of split brackets or collars 16, 17 embracing the rod and held against rotation thereon by means of splines 18. These collars may be individually adjusted along the rod to position them with reference to the bead seats on drums of various widths, and are fixed on said rod at determined adjustments by means of clamping screws 19.

20 is a forward bead-placing ring adapted to be operatively positioned concentric with the axis of rotation of the form 12, with its inner end abutting against the carcass fabric on the forward tapered shoulder or bead seat of said drum and detachably secured by screws 21 to radial lugs 22 on the rim of a spoked wheel-like supporting member 23. The hub portion of the latter is rotatably mounted, through a suitable antifriction bearing, upon the upper end of a holder arm 24 mounted for swinging movement as hereinafter described. The mounting of the forward and rear bead-setting rings rotatably upon their supports is for the purpose of bringing them into action while the drum is rotating, but in cases where the bead cores are applied while the drum is at rest, the rings may be non-rotatably mounted.

25 is a rear bead-setting ring similar in construction and function to the ring 20 and similarly attached by screws 26 to radial lugs 27 on a backing ring 28 which is mounted to turn, through an intermediate row of balls 29 forming part of a bearing of large diameter, upon a non-rotative supporting ring 30 of annular, open-center form, surrounding the shaft structure 10 and integrally secured at its lower side to the upper end of a pivotally-mounted rear holder arm 31 corresponding to the front arm 24 but of shorter height.

Each of the holder arms 24 and 31 forms part of a compound articulated arm structure, 32 being the lower front arm or member pivoted at its upper end at 33 to the lower end of the holder arm 24, and pivoted at its lower end at 34 to the forward supporting sleeve or bracket 16; 35 is a duplicate lower arm or member at the rear, pivoted at its upper end at 36 to the lower end of the holder arm 31, and pivoted at its lower end at 37 to the rear supporting sleeve or bracket 17.

Both of these bead ring and arm assemblies turn about the pivots 34 and 37 in a general vertical plane parallel with or including the axis of rotation of the drum 12 in moving to and from their operative positions with reference to the drum. This avoids the necessity of imparting an axial sliding movement to the bead setters; it utilizes the space below the drum axis for the location of their operating mechanism; it permits the retraction of said bead setters to positions below the level of the upper part of the drum, leaving the operator free to work about the beads with hand tools from above and also leaving free the space in the rear of the drum for the location of fabric-feeding and automatic rolling or stitching devices, and it permits an ample retraction of the rear bead setter with a smaller horizontal component of movement, thereby allowing the use of drums of greater axial length without bringing the operator's hands too close to the retracted bead setter when he is working around the beads.

I have here shown an improved operating arrangement including a common motor for the two bead setters, in the form of a floating ram, which includes a double-acting cylinder 38 for receiving and discharging a pressure fluid such as compressed air, and a piston 39 therein having a rod 40, said cylinder and piston rod being pivotally connected with and supported by the respective lower arms 32 and 35 which, when operated by the ram, act as levers for raising and lowering the bead setters. The forward cylinder head in this case is pivoted at 41 near the upper end of the arm 32, and the rear end of the piston rod carries a head 42 pivoted at 43 to the corresponding point on the arm 35.

For coordinating the pivotal movements of the respective bead setter holder arms 24 and 31 with those of the lower arms 32 and 35, in a predetermined manner, they are linked to the brackets 16 and 17. In the case of the forward arm assembly, a link 44 crossing diagonally through the arm 32 is provided, having its upper end pivoted at 45 on a short arm or pair of ears 46 projecting forwardly from the lower end of the holder arm 24 to constitute a lever therewith, and connected at its lower end with the bracket 16 by a pivot 47 located rearwardly of the pivot 34. A stop lug 48 is provided on the bracket 16, adapted to be encountered by the web of the arm 32 to limit the outward swinging movement of the latter and thus to determine the limit of retracting movement of the bead setter and arm assembly. The crossing of the arm 32 and link 44 in this forward assembly permits an outward pivotal movement of the holder arm 24 upon the holder arm 32, if desired, in addition to the outward swinging movement of the lower arm 32 when the assembly is moving toward its retracted position, so that in the final position, the plane of the bead-setter ring 20 may lie more nearly horizontal than that of the arm 32, as illustrated in broken lines to allow free removal of finished tire from drum. It will be obvious, however, that by a proper selection of relative spacing of the pairs of pivots 33, 45 and 34, 47 in designing the mechanism, other final relative positions of the members 24 and 32 may be obtained.

It would also be possible for this forward assembly to employ, in place of the crossed link, a location of link pivots on the same side of the lower-arm pivots to obtain an approximately parallel motion for the bead ring as in the case of the rear bead-setter assembly as hereinafter described, in which case the desired low retracted position of the upper part of the forward bead setter could be obtained by a greater swinging movement of the lower arm 32, since there is no projecting drum shaft at the forward end to interfere, thereby providing less projection of the forward bead setter in an axial direction when fully retracted.

For the rear assembly, a controlling link 49 is provided, parallel with the lower arm 35 and having its upper end pivoted at 50 to a short arm 51 projecting rearwardly from the lower end of the holder arm 31, while its lower end is connected with the bracket 17 by a pivot 52 located rearwardly of the pivot 37 and spaced therefrom a distance equal to the spacing of the pivots 36 and 50. A stop lug 53 on the bracket 17 is engaged by the link 49 to limit the outward movement of the rear assembly. In this case, as well as that of the front assembly, any other suitable stop arrangement could be provided. During the swinging movements of the lower arm 35, the link 49 imposes a movement of the ring 25 and its immediate supporting devices in planes parallel with themselves to a final retracted position, as indicated in broken lines, in which the inner periphery of the ring 30 approaches but does not quite reach the shaft structure 10. It will be obvious, however, that by a different selection of relative pivot spacings, the final retracted position of the rear bead setter could be in a plane more or less out of the vertical in either direction.

In the operation of this apparatus, the bead setters being in their retracted positions represented in broken lines in Fig. 1, an annular bead core assembly is passed over the drum 12 while the latter is in a collapsed condition, before the tire band is built thereon, and placed upon the rear bead-setter ring 25. A corresponding front bead core assembly may be placed upon the front bead-setter ring 20 at any time before its use is required. The drum being then set in rotation by means of the central power shaft and brought to expanded condition, the inner carcass plies of the tire band are built on the drum in the usual manner. The collars or brackets 16, 17 having previously been adjusted and clamped upon the rod 14 in positions corresponding to the length of the drum 12 which is being used, so that the bead-setter rings will assume operative positions in vertical planes, when the partially-built carcass is ready for the bead cores, pressure fluid is admitted to the right-hand end of the ram cylinder 38 and exhausted from its left-hand end. This will cause the lower arm 35 of the rear bead-setter assembly to be first turned toward a vertical position since the net effective weight of the front assembly is greater by reason of a more outward location of its center of gravity in the retracted position, until the bead-setter ring 25 rests against and is rotated by the fabric on the rear shoulder of the drum, whereupon, by the continued relative movement of the ram cylinder and piston, the forward lower arm 32 is turned toward a vertical position until the bead ring 20 encounters and is rotated by the fabric on the shoulder at the forward end of the drum. The tacky bead assemblies being then adhered to the rubberized carcass fabric and accurately located in concentric positions by the guiding action of the bead-setter rings, the latter may then be withdrawn by admitting fluid pressure to the left-hand end of the ram cylinder and exhausting its right-hand end, to cause a reversal of the foregoing recited movements.

The embodiment of my invention herein disclosed could be variously modified without departing from the scope of the invention as defined in the claims.

I claim:

1. In a tire-building machine, the combination of a form mounted to rotate on a horizontal axis, a bead setter coacting with said form and pivoted for swinging movement in the plane of said axis to an inoperative position below the axis, and lever mechanism supported below said axis for raising and lowering the bead setter into and out of operative position.

2. In a tire-building machine, the combination of a rotary form, a bead-setting ring coacting therewith, and articulated supporting means for said ring acting, by pivotal movement only, to bodily move and also swing the ring endwise of the form in a curved path into and from its operative position.

3. In a tire-building machine, the combination of a tire-building form rotatable on a horizontal axis, a bead setter adapted to coact with said form, a fixed support located below said axis, and an articulated supporting structure in two sections comprising an upper section carrying said bead setter and a lower section pivoted to the upper section and pivotally connected with said fixed support for swinging movement of its members in the plane of said axis.

4. In a tire-building machine, the combination of a form rotatable on a horizontal axis, a supporting bar parallel with said axis, a pair of supporting brackets fixable at different positions along said bar, a pair of bead setters adapted to coact with opposite ends of said form, and supporting structures for said bead setters pivotally connected with said bracket for swinging movement in the plane of said axis.

5. In a tire-building machine, the combination of a tire-building form, a bead setter for coaction therewith, an articulated swinging support for said bead setter including members pivoted together, and means actuated by swinging movement of one of said members for controlling the angular position thereon of the other member.

6. In a tire-building machine, the combination of a bead setter, a supporting bracket, an arm pivoted to said bracket, a bead setter holder pivoted to said arm, and a pivoted link connecting said bracket and holder for controlling the angular position of the latter on the arm during the swinging movements of said arm.

7. In a tire-building machine, the combination of a tire-building form rotatable on a horizontal axis, a pair of bead setters coacting with opposite ends of said form, and means pivotally supporting the respective bead setters for swinging movements of different amplitude in the plane of said axis.

8. In a tire-building machine, the combination of a rotary tire-building form, a bead-setting ring positionable at the forward end of said form, an articulated swinging support for said bead setter including members pivoted together, and means for turning the outermost member outwardly upon the other member during retracting movement of the latter.

9. In a tire-building machine, the combination of a bead setter having a holder lever, an arm pivotally supporting said lever, a bracket pivotally supporting said arm, and a link pivotally connecting said holder lever and bracket and crossing said arm.

10. In a tire-building machine, the combination of a rotary tire-building form, a shaft structure supporting said form, an annular rear bead setter surrounding said shaft structure and coacting with said form, and means pivotally supporting said bead setter for retracting movement in the plane of the form axis and in a path curved throughout its length to a position eccentric to said axis.

11. In a tire-building machine, the combination of a rotary tire-building form, a shaft structure supporting said form, an annular rear bead setter surrounding said shaft structure and coacting with the form in a position concentric therewith, and an articulated support for said bead setter in two sections movable to retract the latter in a path curved throughout its length from an operative to an inoperative position with its axis below that of the form.

12. In a tire-building machine, the combination of a rotatable tire-building form, a bead setter coacting therewith, and means for retracting said bead setter in the plane of the form axis in a path curved throughout its length, from its operative position to an inoperative position substantially parallel with said operative position.

13. In a tire-building machine the combination of a rotary tire-building form, a bead setter coacting therewith, a supporting bracket, an articulated support including an arm pivoted to said bracket and a bead setter holder pivoted to said arm, and a link having pivotal connections with said holder and bracket located on the same side of the arm pivots for maintaining the plane of the bead setter at a substantial constant angle to the form axis during swinging movements of said arm.

14. In a tire-building machine, the combination of a tire-building form rotatable on a horizontal axis and having a supporting shaft structure, an annular rear bead setter coacting with said form and surrounding said shaft structure, an articulated support for said bead setter located below the drum axis and composed of a swinging arm and a bead-setter holder pivoted thereto, and a connection between said arm and holder for maintaining the plane of the bead setter substantially parallel with itself as it retracts to a depressed inoperative position eccentric to said shaft structure.

15. In a tire-building machine, the combination of a tire-building form, pivotally mounted bead setters coacting with opposite ends of said form and oppositely movable in the plane of the form axis, to and from operative position, and a single power ram acting in opposite directions upon the respective bead setters for swinging said bead setters to and from their operative positions.

16. In a tire-building machine, the combination of a tire-building form, a pair of bead setters coacting with opposite ends of said form, operating devices pivotally supporting said bead setters, and a floating fluid-pressure ram supported by said operating devices for actuating the latter.

17. In a tire-building machine, the combination of a tire-building form, a pair of bead setters coacting with opposite ends of said form, articulated supporting and operating devices for said bead setters each including a swinging arm and a bead setter holder pivoted thereto, and a floating fluid-pressure ram supported by said arm and including a cylinder pivoted to one of the arms and a plunger pivoted to the other arm.

HENRY C. BOSTWICK.